(12) United States Patent
Morganstern et al.

(10) Patent No.: US 12,204,816 B2
(45) Date of Patent: *Jan. 21, 2025

(54) DEVICE GROUPING

(71) Applicant: Sonos, Inc., Santa Barbara, CA (US)

(72) Inventors: Mark Morganstern, Santa Barbara, CA (US); Alec Ferguson, Ipswich, MA (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,611

(22) Filed: May 15, 2023

(65) Prior Publication Data

US 2024/0045646 A1 Feb. 8, 2024

Related U.S. Application Data

(63) Continuation of application No. 17/074,328, filed on Oct. 19, 2020, now Pat. No. 11,650,786, which is a continuation of application No. 16/277,788, filed on Feb. 15, 2019, now Pat. No. 10,809,971, which is a continuation of application No. 14/338,710, filed on Jul. 23, 2014, now Pat. No. 10,209,947.

(51) Int. Cl.
| | |
|---|---|
| *G06F 17/00* | (2019.01) |
| *G06F 3/16* | (2006.01) |
| *H04L 67/02* | (2022.01) |
| *H04L 67/10* | (2022.01) |
| *H04R 29/00* | (2006.01) |

(52) U.S. Cl.
CPC .............. *G06F 3/165* (2013.01); *H04L 67/02* (2013.01); *H04L 67/10* (2013.01); *H04R 29/007* (2013.01); *H04R 2227/005* (2013.01)

(58) Field of Classification Search
CPC ......... G06F 3/165; H04L 67/02; H04L 67/10; H04R 29/007; H04R 2227/005
USPC .......................................................... 700/94
See application file for complete search history.

(56) References Cited

U.S. PATENT DOCUMENTS

| | | | |
|---|---|---|---|
| 5,182,552 A | 1/1993 | Paynting | |
| 5,440,644 A | 8/1995 | Farinelli et al. | |
| 5,761,320 A | 6/1998 | Farinelli et al. | |
| 5,923,902 A | 7/1999 | Inagaki | |

(Continued)

FOREIGN PATENT DOCUMENTS

| | | |
|---|---|---|
| EP | 1389853 A1 | 2/2004 |
| EP | 1940111 A2 | 7/2008 |

(Continued)

OTHER PUBLICATIONS

Advisory Action mailed on Sep. 14, 2017, issued in connection with U.S. Appl. No. 15/214,324, filed Jul. 19, 2016, 5 pages.

(Continued)

*Primary Examiner* — Paul C McCord

(57) ABSTRACT

An input at a physical interface of a first playback device is detected. The input may indicate a playback command. Via the first playback device, the second playback device is determined to be currently playing media content. Based on determining that the second playback device is currently playing media content and based on receiving the input at the physical interface, the first playback device is caused to play the media content synchronously with the second playback device.

20 Claims, 8 Drawing Sheets

(56) References Cited

U.S. PATENT DOCUMENTS

| | | |
|---|---|---|
| 5,946,343 A | 8/1999 | Schotz et al. |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,587,127 B1 | 7/2003 | Leeke et al. |
| 6,604,023 B1 | 8/2003 | Brown et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 6,785,513 B1 | 8/2004 | Sivaprakasam |
| 7,130,608 B2 | 10/2006 | Hollstrom et al. |
| 7,130,616 B2 | 10/2006 | Janik |
| 7,143,939 B2 | 12/2006 | Henzerling |
| 7,187,947 B1 | 3/2007 | White et al. |
| 7,218,708 B2 | 5/2007 | Berezowski et al. |
| 7,236,773 B2 | 6/2007 | Thomas |
| 7,295,548 B2 | 11/2007 | Blank et al. |
| 7,302,468 B2 | 11/2007 | Wijeratne |
| 7,483,538 B2 | 1/2009 | McCarty et al. |
| 7,539,551 B2 | 5/2009 | Komura et al. |
| 7,558,224 B1 | 7/2009 | Surazski et al. |
| 7,571,014 B1 | 8/2009 | Lambourne et al. |
| 7,626,952 B2 | 12/2009 | Slemmer et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,668,990 B2 | 2/2010 | Krzyzanowski et al. |
| 7,742,832 B1 | 6/2010 | Feldman et al. |
| 7,761,176 B2 | 7/2010 | Ben-Yaacov et al. |
| 7,805,210 B2 | 9/2010 | Cucos et al. |
| 7,817,960 B2 | 10/2010 | Tan et al. |
| 7,849,181 B2 | 12/2010 | Slemmer et al. |
| 7,853,341 B2 | 12/2010 | McCarty et al. |
| 7,962,482 B2 | 6/2011 | Handman et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,189,824 B2 | 5/2012 | Strauss et al. |
| 8,234,395 B2 | 7/2012 | Millington |
| 8,239,559 B2 | 8/2012 | Rajapakse |
| 8,290,603 B1 | 10/2012 | Lambourne |
| 8,311,656 B2 | 11/2012 | Carrier |
| 8,326,951 B1 | 12/2012 | Millington et al. |
| 8,423,893 B2 | 4/2013 | Ramsay et al. |
| 8,483,853 B1 | 7/2013 | Lambourne |
| 8,700,730 B2 | 4/2014 | Rowe |
| 8,762,565 B2 | 6/2014 | Togashi et al. |
| 8,788,080 B1 | 7/2014 | Kallai et al. |
| 8,965,544 B2 | 2/2015 | Ramsay |
| 9,246,866 B1 | 1/2016 | Sanders |
| 9,516,440 B2 | 12/2016 | Jarvis et al. |
| 2001/0042107 A1 | 11/2001 | Palm |
| 2002/0002039 A1 | 1/2002 | Qureshey et al. |
| 2002/0003548 A1 | 1/2002 | Krusche et al. |
| 2002/0022453 A1 | 2/2002 | Balog et al. |
| 2002/0026442 A1 | 2/2002 | Lipscomb et al. |
| 2002/0072816 A1 | 6/2002 | Shdema et al. |
| 2002/0124097 A1 | 9/2002 | Isely et al. |
| 2003/0020763 A1 | 1/2003 | Mayer et al. |
| 2003/0157951 A1 | 8/2003 | Hasty, Jr. |
| 2003/0158737 A1 | 8/2003 | Csicsatka |
| 2003/0167335 A1 | 9/2003 | Alexander |
| 2003/0177889 A1 | 9/2003 | Koseki et al. |
| 2003/0198257 A1 | 10/2003 | Sullivan et al. |
| 2004/0010727 A1 | 1/2004 | Fujinami |
| 2004/0015252 A1 | 1/2004 | Aiso et al. |
| 2004/0024478 A1 | 2/2004 | Hans et al. |
| 2004/0117044 A1 | 6/2004 | Konetski |
| 2004/0131192 A1 | 7/2004 | Metcalf |
| 2004/0223622 A1 | 11/2004 | Lindemann et al. |
| 2004/0225389 A1 | 11/2004 | Ledoux et al. |
| 2004/0228367 A1 | 11/2004 | Mosig et al. |
| 2005/0002535 A1 | 1/2005 | Liu et al. |
| 2005/0021470 A1 | 1/2005 | Martin et al. |
| 2005/0131558 A1 | 6/2005 | Braithwaite et al. |
| 2005/0144284 A1 | 6/2005 | Ludwig et al. |
| 2005/0254505 A1 | 11/2005 | Chang et al. |
| 2005/0289224 A1 | 12/2005 | Deslippe et al. |
| 2005/0289244 A1 | 12/2005 | Sahu et al. |
| 2006/0041616 A1 | 2/2006 | Ludwig et al. |
| 2006/0123080 A1 | 6/2006 | Baudino et al. |
| 2006/0149402 A1 | 7/2006 | Chung |
| 2007/0142022 A1 | 6/2007 | Madonna et al. |
| 2007/0142944 A1 | 6/2007 | Goldberg et al. |
| 2007/0189544 A1 | 8/2007 | Rosenberg |
| 2007/0288610 A1 | 12/2007 | Saint et al. |
| 2008/0025535 A1 | 1/2008 | Rajapakse |
| 2008/0045140 A1 | 2/2008 | Korhonen |
| 2008/0066094 A1 | 3/2008 | Igoe |
| 2008/0066120 A1 | 3/2008 | Igoe |
| 2008/0077261 A1 | 3/2008 | Baudino et al. |
| 2008/0126975 A1 | 5/2008 | Vassigh et al. |
| 2008/0144861 A1 | 6/2008 | Melanson et al. |
| 2008/0152165 A1 | 6/2008 | Zacchi |
| 2008/0162668 A1 | 7/2008 | Miller |
| 2008/0177822 A1 | 7/2008 | Yoneda |
| 2009/0097672 A1 | 4/2009 | Buil et al. |
| 2009/0228919 A1 | 9/2009 | Zott et al. |
| 2010/0262929 A1 | 10/2010 | Avery |
| 2012/0263318 A1 | 10/2012 | Millington et al. |
| 2013/0080955 A1 | 3/2013 | Reimann et al. |
| 2013/0103873 A1* | 4/2013 | Reilly ............... G06F 1/1632 710/303 |
| 2013/0170363 A1 | 7/2013 | Millington et al. |
| 2013/0177186 A1 | 7/2013 | Schul |
| 2013/0243199 A1 | 9/2013 | Kallai et al. |
| 2014/0032710 A1 | 1/2014 | Shin et al. |
| 2014/0093085 A1 | 4/2014 | Jarvis et al. |
| 2014/0122590 A1 | 5/2014 | Svendsen |
| 2014/0230015 A1 | 8/2014 | Pollock |
| 2014/0357234 A1 | 12/2014 | Sullivan |
| 2015/0179227 A1 | 6/2015 | Russell |
| 2015/0286360 A1* | 10/2015 | Wachter ............. G06F 3/0412 345/173 |
| 2015/0287419 A1 | 10/2015 | Chen et al. |

FOREIGN PATENT DOCUMENTS

| | | |
|---|---|---|
| KR | 20050120315 A | 12/2005 |
| WO | 200153994 | 7/2001 |
| WO | 03093950 A2 | 11/2003 |
| WO | 2003093950 A2 | 11/2003 |
| WO | 2005013047 A2 | 2/2005 |
| WO | 2012137190 A1 | 10/2012 |
| WO | 2014074089 A1 | 5/2014 |

OTHER PUBLICATIONS

Advisory Action mailed on Dec. 22, 2011, issued in connection with U.S. Appl. No. 11/853,790, filed Sep. 11, 2007, 2 pages.
Advisory Action mailed on Nov. 22, 2016, issued in connection with U.S. Appl. No. 14/338,710, filed Jul. 23, 2014, 6 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European EPC Article 94.3 mailed on Nov. 3, 2023, issued in connection with European Application No. 21209123.5, 10 pages.

(56) References Cited

OTHER PUBLICATIONS

European Patent Office, European Extended Search Report mailed on Apr. 4, 2022, issued in connection with European Application No. 21209123.5, 12 pages.
European Patent Office, European Extended Search Report mailed on Dec. 6, 2019, issued in connection with European Application No. 15824943.3, 5 pages.
European Patent Office, European Search Report mailed on Oct. 9, 2017, issued in connection with EP Application No. 15824943.3, 8 pages.
European Patent Office, Summons to Attend Oral Proceedings mailed on Dec. 7, 2020, issued in connection with European Application No. 15824943.3, 10 pages.
Final Office Action mailed Jul. 23, 2014, issued in connection with U.S. Appl. No. 13/896,037, filed May 16, 2013, 12 pages.
Final Office Action mailed on Feb. 10, 2014, issued in connection with U.S. Appl. No. 13/013,740, filed Jan. 25, 2011, 13 pages.
Final Office Action mailed on Oct. 13, 2011, issued in connection with U.S. Appl. No. 11/853,790, filed Sep. 11, 2007, 10 pages.
Final Office Action mailed on Aug. 18, 2016, issued in connection with U.S. Appl. No. 14/338,710, filed Jul. 23, 2014, 11 pages.
Final Office Action mailed on Jun. 21, 2017, issued in connection with U.S. Appl. No. 15/214,324, filed Jul. 19, 2016, 12 pages.
Final Office Action mailed on Aug. 27, 2018, issued in connection with U.S. Appl. No. 15/214,324, filed Jul. 19, 2016, 14 pages.
Final Office Action mailed on Dec. 28, 2017, issued in connection with U.S. Appl. No. 14/338,710, filed Jul. 23, 2014, 5 pages.
First Action Interview Pilot Program Pre-Interview Communication mailed on Feb. 10, 2016, issued in connection with U.S. Appl. No. 14/338,710, filed Jul. 23, 2014, 3 pages.
Hold Play/Pause to start a Favorite Station or Playlist. Sonos, Oct. 16, 2013, 8 pages [online], [retrieved on Mar. 16, 2022]. Retrieved from the Internet: URL:https://en.community.sonos.com/controllers-software-228995/hold-play-pause-to-start-a-favorite-station-or-playlist-5710391.
International Bureau, International Preliminary Report on Patentability, mailed on Oct. 17, 2013, issued in connection with International Application No. PCT/IB2012/052071, filed on Apr. 26, 2012, 7 pages.
International Searching Authority, International Preliminary Report on Patentability mailed on Feb. 2, 2017, issued in connection with International Application No. PCT/US2015/041340, filed on Jul. 21, 2015, 8 pages.
International Searching Authority, International Search Report mailed on Aug. 23, 2012, issued in connection with International Application No. PCT/IB2012/052071, filed on Apr. 26, 2012, 3 pages.
International Searching Authority, International Search Report mailed on Oct. 29, 2015, issued in connection with International Application No. PCT/US2015/041340, filed on Jul. 21, 2015, 3 pages.
International Searching Authority, Written Opinion mailed on Aug. 23, 2012, issued in connection with International Application No. PCT/IB2012/052071, filed on Apr. 26, 2012, 6 pages.
International Searching Authority, Written Opinion mailed on Oct. 29, 2015, issued in connection with International Application No. PCT/US2015/041340, filed on Jul. 21, 2015, 6 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.

Mills David L., "Network Time Protocol (Version 3) Specification, Implementation and Analysis," Network Working Group, Mar. 1992, 7 pages.
Non-Final Office Action mailed Jan. 7, 2014, issued in connection with U.S. Appl. No. 13/896,829, filed May 17, 2013, 11 pages.
Non-Final Office Action mailed Feb. 10, 2014, issued in connection with U.S. Appl. No. 13/083,499, filed Apr. 8, 2011, 12 pages.
Non-Final Office Action mailed Jul. 23, 2014, issued in connection with U.S. Appl. No. 14/256,434, filed Apr. 18, 2014, 12 pages.
Non-Final Office Action mailed on Jun. 8, 2022, issued in connection with U.S. Appl. No. 17/074,328, filed Oct. 19, 2020, 19 pages.
Non-Final Office Action mailed on Mar. 8, 2011, issued in connection with U.S. Appl. No. 11/853,790, filed Sep. 11, 2007, 10 pages.
Non-Final Office Action mailed on Feb. 20, 2020, issued in connection with U.S. Appl. No. 16/277,788, filed Feb. 15, 2019, 14 pages.
Non-Final Office Action mailed on Jan. 26, 2017, issued in connection with U.S. Appl. No. 15/214,324, filed Jul. 19, 2016, 10 pages.
Non-Final Office Action mailed on Sep. 27, 2013, issued in connection with U.S. Appl. No. 13/013,740, filed Jan. 25, 2011, 12 pages.
Non-Final Office Action mailed on Jun. 29, 2017, issued in connection with U.S. Appl. No. 14/338,710, filed Jul. 23, 2014, 13 pages.
Non-Final Office Action mailed on Apr. 3, 2018, issued in connection with U.S. Appl. No. 15/214,324, filed Jul. 19, 2016, 15 pages.
Notice of Allowability mailed on Apr. 18, 2013, issued in connection with U.S. Appl. No. 11/853,790, filed Sep. 11, 2007, 4 pages.
Notice of Allowance mailed on Jun. 2, 2014, issued in connection with U.S. Appl. No. 13/083,499, filed Apr. 8, 2011, 5 pages.
Notice of Allowance mailed on Jun. 12, 2014, issued in connection with U.S. Appl. No. 13/896,829, filed May 17, 2013, 5 pages.
Notice of Allowance mailed on Jun. 15, 2020, issued in connection with U.S. Appl. No. 16/277,788, filed Feb. 15, 2019, 8 pages.
Notice of Allowance mailed on Nov. 15, 2018, issued in connection with U.S. Appl. No. 15/214,324, filed Jul. 19, 2016, 6 pages.
Notice of Allowance mailed on Apr. 20, 2018, issued in connection with U.S. Appl. No. 14/338,710, filed Jul. 23, 2014, 8 pages.
Notice of Allowance mailed on Nov. 22, 2022, issued in connection with U.S. Appl. No. 17/074,328, filed Oct. 19, 2020, 12 pages.
Notice of Allowance mailed on Nov. 27, 2018, issued in connection with U.S. Appl. No. 14/338,710, filed Jul. 23, 2014, 5 pages.
Notice of Allowance mailed on Apr. 6, 2017, issued in connection with U.S. Appl. No. 14/338,710, filed Jul. 23, 2014, 7 pages.
Palm, Inc., "Handbook for the Palm VII Handheld," May 2000, 311 pages.
Polycom Conference Composer User Guide, copyright 2001, 29 pages.
Presentations at WinHEC 2000, May 2000, 138 pages.
Rane: DragNet software; available for sale at least 2006.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 32 manual: copyright 2001.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Yamaha DME Designer software manual: Copyright 2004, 482 pages.

\* cited by examiner

DEVICE GROUPING

CROSS REFERENCE TO RELATED APPLICATION

This disclosure claims the benefit of priority as a continuation under 35 U.S.C. § 120 to U.S. application Ser. No. 17/074,328 entitled "Device Grouping" filed on Oct. 19, 2020, which claims the benefit of priority as a continuation under 35 U.S.C. § 120 to U.S. application Ser. No. 16/277, 788 entitled "Device Grouping" filed on Feb. 15, 2019, which claims the benefit of priority as a continuation under 35 U.S.C. § 120 to U.S. application Ser. No. 14/338,710 entitled "Device Grouping" filed on Jul. 23, 2014, the contents of each of which are hereby incorporated by reference in their entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
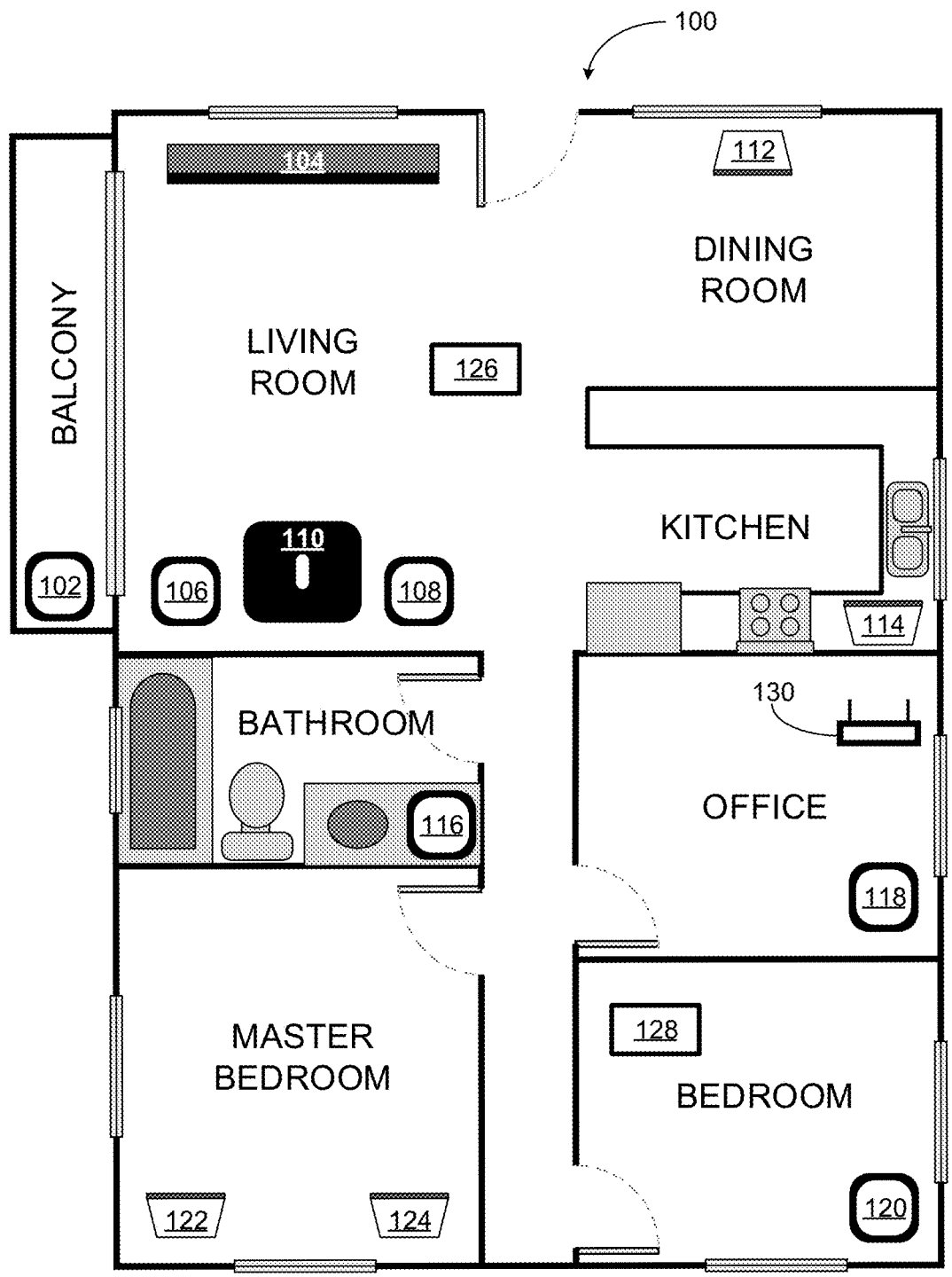
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

In some situations, control of a media playback system that includes multiple playback devices may occur by way of a control device communicatively coupled to one or more of the playback devices. The control device could be, for example, a smart phone or a tablet computer that is arranged to control the playback devices. The control device may provide an interface for control or customization of playback of media by the playback devices in a variety of ways. For example, the control device may respectively associate several playback devices located in a user's home between first and second zones (or more zones) so that playback devices in the first zone (e.g., a living room) play back a first media in synchrony and playback devices in the second zone (e.g., a patio) play back a second media in synchrony. As another example, the control device may control playback volumes corresponding to playback devices of the first and second zones.

However, control of the first playback device by way of a separate control device may in some respects or situations be inefficient or otherwise undesirable. As such, according to some examples described here, the first playback device may be controlled by way of input detected at a control interface of the first playback device. For example, one control action may involve having a first playback device (perhaps not currently playing back media) join an existing zone that includes a second playback device currently playing back media. For instance, the control interface of the first playback device may include one or more push-buttons. A push of such a push-button (or other such suitable input) at the control interface may cause the first playback device to form a "zone" with the second playback device that is currently playing back media. Such an input may also cause the first playback device to playback the media in synchrony with at least the second playback device.

In other examples, the input detected at the control interface of the first playback device could also be used to control at least a third playback device. For instance, before the input is detected at the control interface, the first and third playback devices may be within a first zone (e.g., a "bonded pair" in some instances), and in response to detecting the input, the first playback device may cause both the first and third playback devices to leave the first zone to join a second zone that includes the second playback device. After joining the second zone, the first and third playback devices may playback media in synchrony with the second playback device. In another example, in response to the input, the third playback device may remain in the first zone and play back media that corresponds to the first zone, while the first playback device nonetheless joins the second zone and plays back media with the second playback device.

Additionally, instead of control by way of a control interface attached to the first playback device, control may occur by way of a controller that is communicatively coupled with the first playback device but that is not communicatively coupled with the second playback device. In some examples, such a controller may provide a physical interface for input, but not a graphical interface. In some circumstances, using the bonded controller for control of the first playback device rather than a control device communicatively coupled or otherwise arranged to control multiple playback devices may be more efficient. As such, input to the bonded controller may indicate a command for the first playback device to form a zone with the second playback device and to playback the media in synchrony with the second playback device.

Accordingly, some examples described herein involve, among other things, detecting an input at a control interface or a bonded controller of a first playback device so that the first playback device (i) forms a zone with a second playback device that is already playing back media and (ii) plays back the media in synchrony with the at least one second playback device. Other aspects of the examples will be made apparent in the remainder of the description herein.

In one aspect, a method is provided. The method involves detecting, via a control interface of a first playback device while at least one second playback device is playing media, an input indicating a command for the first playback device to (i) form a zone with the second playback device and (ii) play back the media in synchrony with the at least one second playback device and based on the detected input, causing (i) the first playback device and the second playback device to form the zone and (ii) the first playback device to play back the media in synchrony with the at least one second playback device.

In another aspect, a first playback device is provided. The first playback device includes a processor and memory storing instructions that when executed by the first playback device, cause the first playback device to perform functions. The functions include detecting, via a control interface of the first playback device while at least one second playback device is playing media, an input indicating a command for the first playback device to (i) form a zone with the second playback device and (ii) play back the media in synchrony with the at least one second playback device; and based on the detected input, causing (i) the first playback device and the second playback device to form the zone and (ii) the first playback device to play back the media in synchrony with the at least one second playback device.

In yet another aspect, a non-transitory computer readable memory is provided. The non-transitory computer readable memory has stored thereon instructions executable by a first playback device to cause the first playback device to perform functions. The functions include detecting, via a control interface of the first playback device while at least one second playback device is playing media, an input indicating a command for the first playback device to (i) form a zone with the second playback device and (ii) play back the media in synchrony with the at least one second playback device; and based on the detected input, causing (i) the first playback device and the second playback device to form the zone and (ii) the first playback device to play back the media in synchrony with the at least one second playback device.

In another aspect, a method is provided. The method involves detecting, by a control device while at least one first playback device is playing media, an input indicating a command for a second playback device to (i) form a zone with the first playback device and (ii) play back the media in synchrony with the at least one first playback device, wherein the control device is communicatively coupled to the second playback device and not communicatively coupled to the first playback device; and based on the detected input, causing (i) the first playback device and the second playback device to form the zone and (ii) the second playback device to play back the media in synchrony with the at least one first playback device.

In another aspect, a control device is provided. The control device includes a processor and memory storing instructions that when executed by the control device, cause the control device to perform functions. The functions include detecting, by the control device while at least one first playback device is playing media, an input indicating a command for a second playback device to (i) form a zone with the first playback device and (ii) play back the media in synchrony with the at least one first playback device, wherein the control device is communicatively coupled to the second playback device and not communicatively coupled to the first playback device; and based on the detected input, causing (i) the first playback device and the second playback device to form the zone and (ii) the second playback device to play back the media in synchrony with the at least one first playback device.

In yet another aspect, a non-transitory computer readable memory is provided. The non-transitory computer readable memory has stored thereon instructions executable by a control device to perform functions. The functions include detecting, by the control device while at least one first playback device is playing media, an input indicating a command for a second playback device to (i) form a zone with the first playback device and (ii) play back the media in synchrony with the at least one first playback device, wherein the control device is communicatively coupled to the second playback device and not communicatively coupled to the first playback device; and based on the detected input, causing (i) the first playback device and the second playback device to form the zone and (ii) the second playback device to play back the media in synchrony with the at least one first playback device.

It will be understood by one of ordinary skill in the art that this disclosure includes numerous other embodiments. While some examples described herein may refer to functions performed by given actors such as "users" and/or other entities, it should be understood that this is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
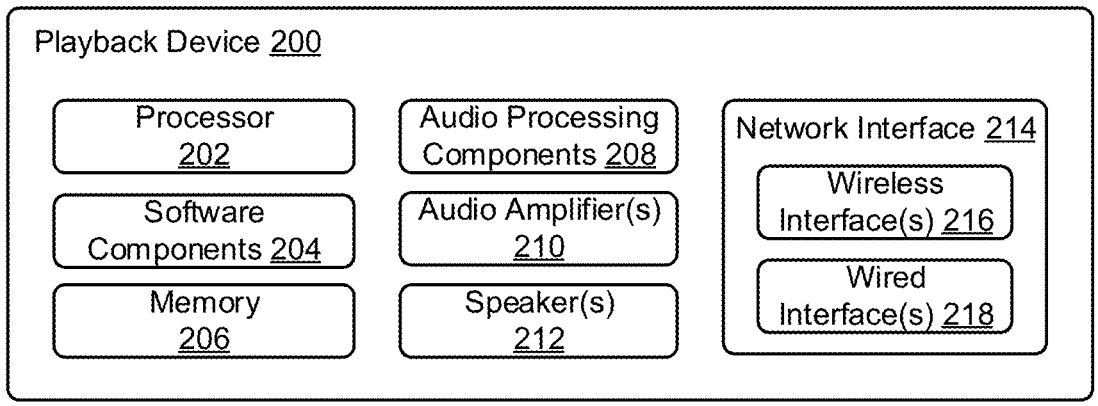
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
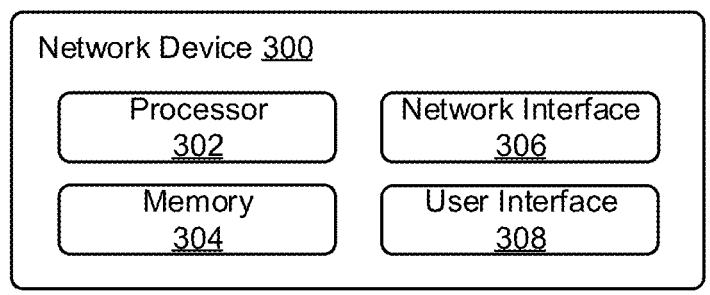
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
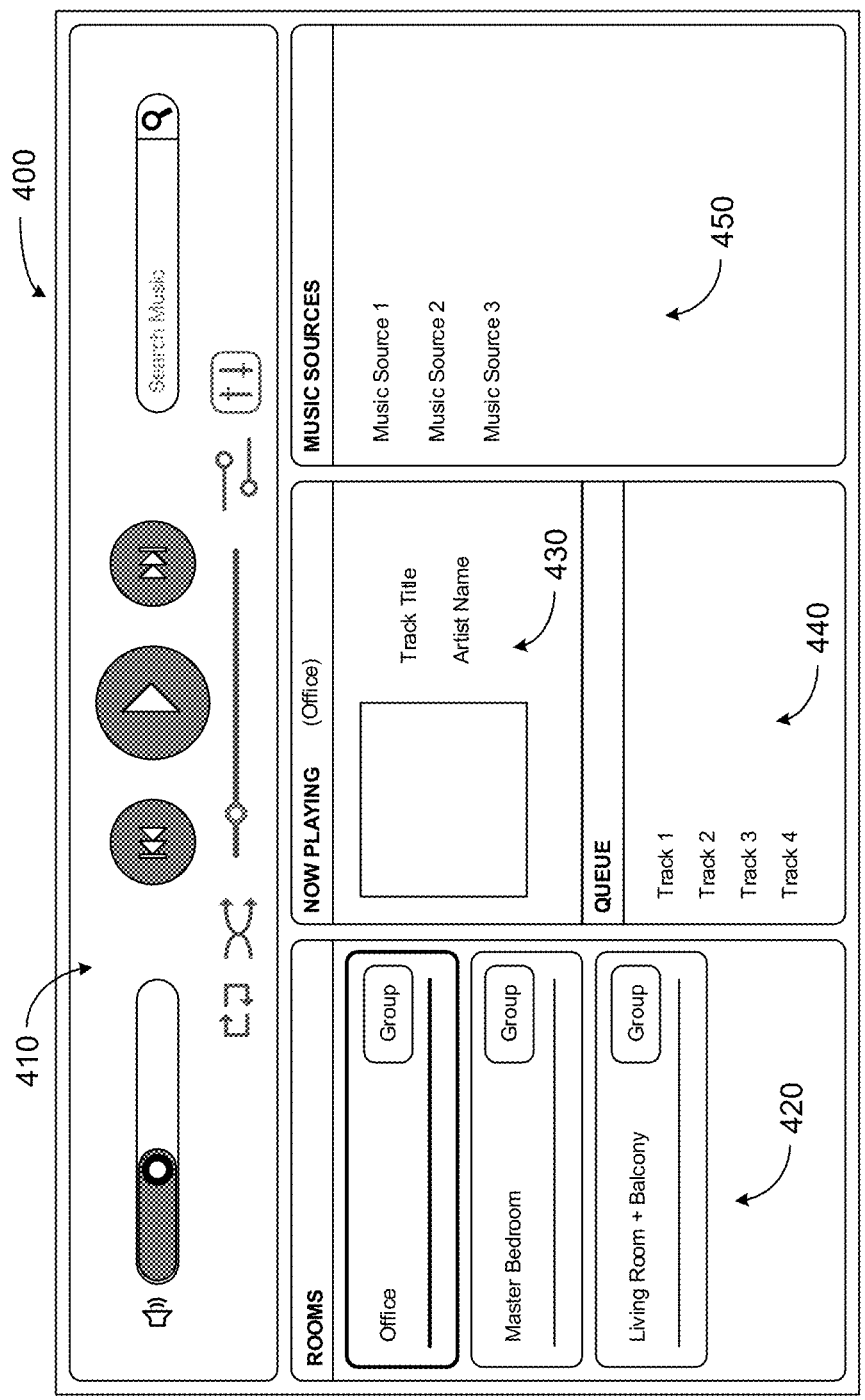
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Method for Controlling a Media Playback System

As discussed above, some examples described herein involve, among other things, detecting input at a control interface of a first playback device or a bonded controller of the first playback device such that the first playback device (i) forms a zone with a second playback device that is currently playing back media and (ii) plays back the media in synchrony with the at least one second playback device. Other aspects of the examples will be made apparent in the remainder of the description herein.

In this section the term "computing device" may have the same meaning as the terms "network device" and/or "controller device" used in previous sections, unless it is clear from context that this is not the case. The term "server" may also be used interchangeably with the term "server device." Terminology such as "server," "server device," "controller," "controller device," "network device," and "computing device" are generally used for explanatory purposes in this disclosure and are not meant to be limiting. One of skill in the art will recognize that any suitable computing device may perform various functions disclosed herein and that the preceding list of terms is non-exhaustive.

Figure 5A:
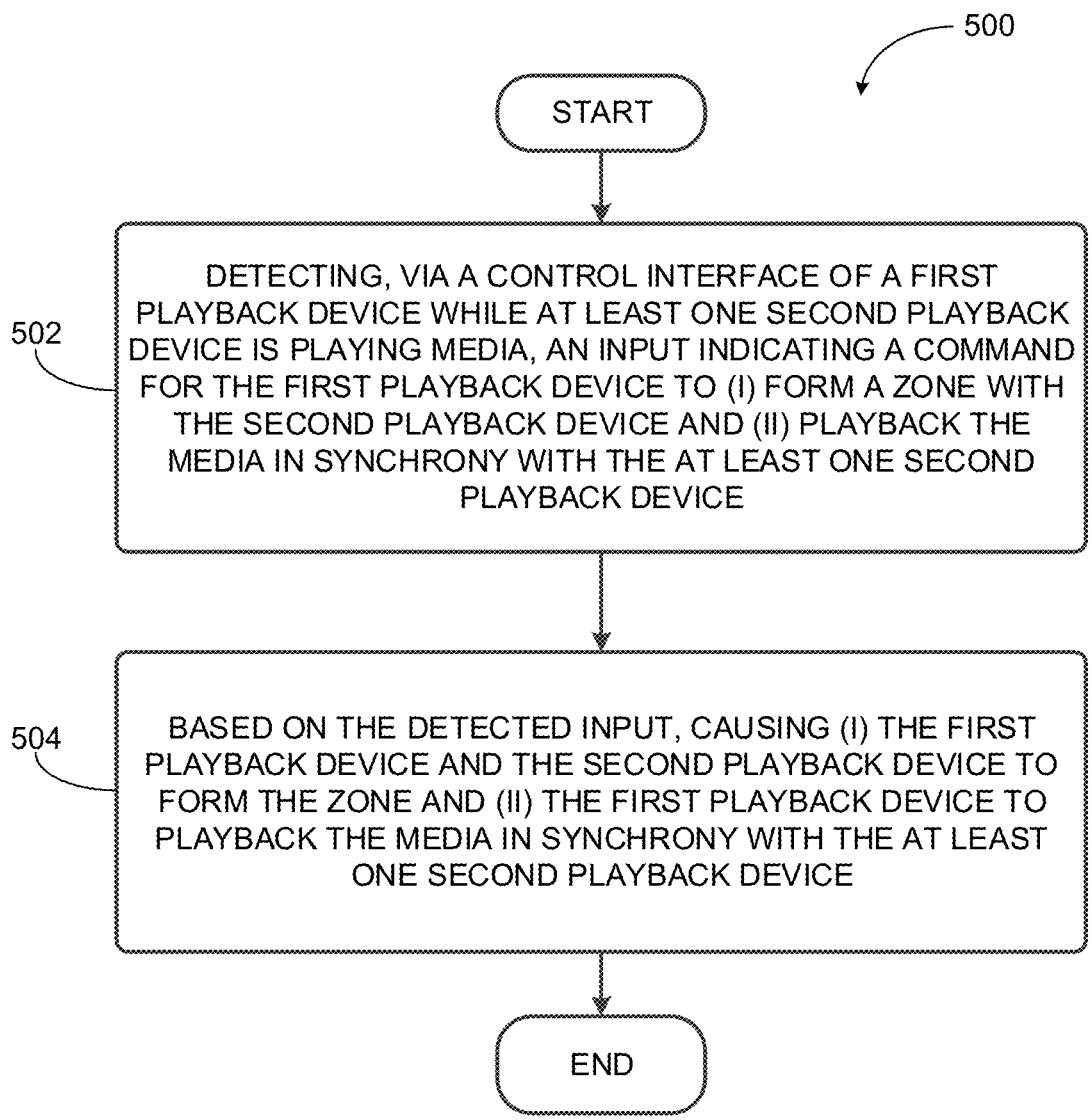
FIG. 5A shows an example flow diagram for an example method.

Method 500 shown in FIG. 5A presents an example method that can be implemented within an operating environment involving, for example, the media playback system 100 of FIG. 1 and one or more of the playback device 200 of FIG. 2. Method 500 may include one or more operations, functions, or actions as illustrated by one or more of blocks 502 and 504. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

At block 502, the method includes detecting, via a control interface of a first playback device while at least one second playback device is playing media, an input indicating a command for the first playback device to (i) form a zone with the second playback device and (ii) playback the media in synchrony with the at least one second playback device. Detecting the input may involve receiving the input at the control interface of the first playback device.

Figure 5B:
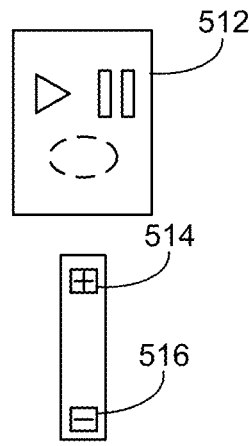
FIG. 5B shows an example control interface.

For instance, the control interface of the first playback device may include a push-button, a knob, a switch, a keypad, a touchscreen graphical interface, or other controls for receiving input. As an example, FIG. 5B shows a control interface that includes a first push-button 512, a second push-button 514, and a third push-button 516. Such an example control interface may include additional and/or alternative controls as well.

The first push-button 512 may receive input, and in response cause the first playback device (or other playback devices included in a zone with the first playback device) to (i) start, resume, or pause playback of media, or (ii) form a zone with another playback device (e.g., the second playback device). For instance a push and release input to the first push-button 512 may cause the first playback device to start, resume, or pause playback of media, whereas a push and hold input to the first push-button 512 may cause the first playback device to form a zone with another playback device. The first push-button 512 receiving input may cause the first playback device to perform other functions as well.

By further example, the second push-button 514 may receive input and cause the first playback device (or other playback devices included in a zone with the first playback device) to increase playback volume. The third push-button 516 may also receive input and cause the first playback device to decrease playback volume. Inputs received at the second push-button 514 and the third push-button 516 may cause the first playback device to perform other functions as well.

Figure 5C:
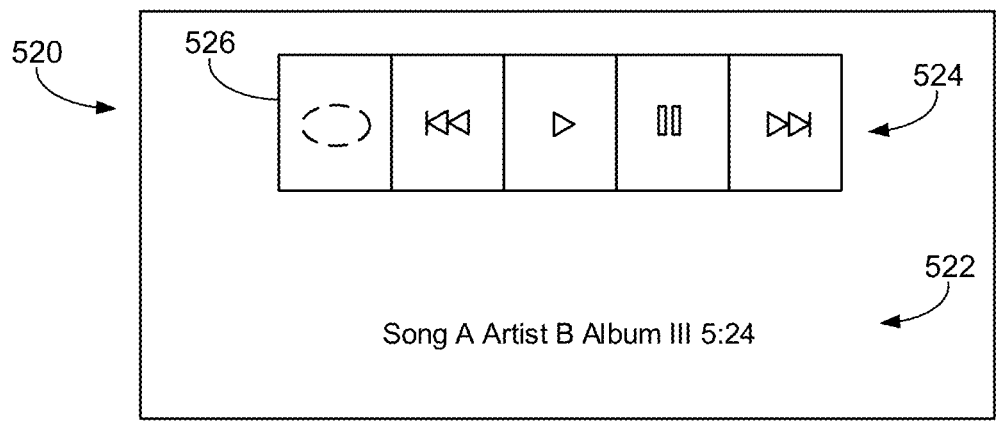
FIG. 5C shows another example control interface.

In another example, the control interface may include a touchscreen or similar interactive display, such as depicted in FIG. 5C. In some cases, the touchscreen 520 may provide a visual indication 522 of media (e.g., text or icons) that is playing back by the first playback device. Also, the touchscreen 520 may include an area 524 designated to receive or detect inputs related to controlling playback of media by the first playback device (or also other playback devices). In one example, the area 526 may be designated to detect an input, and in response, cause the first playback device to form a zone with at least the second playback device. However, in other examples, the area 526 may detect inputs representing commands for the first playback device to perform other functions as well.

Figure 5D:
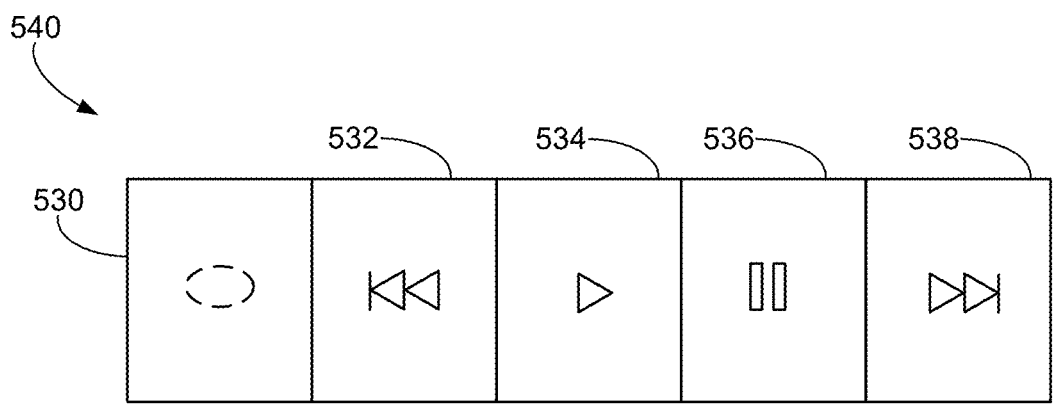
FIG. 5D shows yet another example control interface.

In yet another example depicted by FIG. 5D, a control interface 540 may include several push-buttons. For example, receiving input at push-button 530 may cause the first playback device to form the zone with at least the second playback device. Receiving input at push-button 532 may cause the first playback device (or also other playback devices) to advance through a playback queue in a first direction, receiving input at push-button 534 may cause the first playback device (or also other playback devices) to begin playback of media, receiving input at push-button 536 may cause the first playback device (or also other playback devices) to pause playback of media, and receiving input at push-button 538 may cause the first playback device (or also other playback devices) to advance through a playback queue in a second direction, Referring back to FIG. 5A, forming the zone at block 504 could include (i) forming a zone whereby playback devices of the zone are configured to play back media in synchrony with other playback devices of the zone, (ii) forming a group of zones whereby playback devices of the group of zones are configured to play back media in synchrony with other playback devices of the group of zones, or (iii) forming a zone whereby playback functions (e.g., pause, play, track repeat, track shuffle, or volume) of playback devices of the zone are configured to be controlled in unison via input(s) received at the first playback device and/or another controller.

As an illustrative example, a control interface of playback device 112 of FIG. 1 may receive the input. As depicted at block 504, in response to detecting the input, the playback device 112 may form a zone (e.g., join a zone) that includes playback devices 114 and 118. Playback devices 114 and 118 may be playing back media when the input is detected at playback device 112. Then, playback device 112, in response to detecting the input, may begin playing back, in synchrony with playback devices 114 and 118, the media that playback devices 114 and 118 are already playing back.

In another example, in response to detecting the input the first playback device may determine a zone that includes the second playback device so that the first playback device may form a zone with the second playback device. For instance, the first playback device may determine, among playback devices representing zones that are detectable by the first playback device, a zone that includes the second playback device. The second playback device may have a highest signal strength detected by the first playback device, perhaps indicating that the second playback device is in closest proximity to the first playback device among the detectable playback devices. In one example, the first playback device may compare only signal strengths of playback devices that are zone coordinators, since the first playback device may receive media from a group coordinator of a zone that the first playback device joins.

Alternatively or additionally, the first playback device may determine that the second playback device (or a zone including the second playback device) has a most recent interaction time. A most recent interaction time of a playback device could represent a time when a playback device last detected input or provided playback of media. A most recent interaction time of a zone may represent a time when any playback device of the zone last detected input.

The first playback device may also determine the zone that includes the second playback device based on an order in which the first playback device was last included in various zones. Other example criteria for determining the zone that includes the second playback device are possible.

In various situations, the first playback device may form the zone with the second playback device without providing indications of multiple potential zones for the first playback device to join. That is, once the input is received at the control interface, the first playback device may automatically determine the zone that includes the second playback device and form the zone with the second playback device without receiving or detecting other inputs.

However in other situations, prior to receiving the input the control interface of the first playback device may provide (i) an indication of a zone that includes the second playback device, (ii) an indication of the second playback device, or (iii) an indication of media being played back by the second playback device or being played back by other playback devices of the zone that includes the second playback device.

As an example, the control interface of the first playback device (or another portion of the first playback device) may include speakers (e.g., speakers 212 of FIG. 2) that provide (i) an audio indication of a zone that includes the second playback device, (ii) an audio indication of the second playback device, and/or (iii) an audio indication of media being played back by the second playback device or being played back by other playback devices of the zone that includes the second playback device. For instance, the first playback device could be playback device 116 in the bathroom of FIG. 1, and the control interface of playback device 116 may provide an audio indication that sounds like speech indicating the second playback device 118 (e.g., "Device 2") or the Office zone (e.g., "Office"). Or, playback device 118 could be playing back media that includes Song A by Artist B and the indication provided by the control interface of playback device 116 may indicate, in audio form, that the second playback device 118 is playing back Song A by Artist B. Alternatively or additionally, the control interface may provide as the indication playback of an audio or visual sample of the media that is being played back by the second playback device 118. Other examples of audio indications are possible.

As a further example, the control interface may include a display screen (e.g. touchscreen 520 of FIG. 5C) that provides (i) a visual indication of a zone that includes the second playback device, (ii) a visual indication of the second playback device, or (iii) a visual indication of media being played back by the second playback device or being played back by other playback devices of the zone that includes the second playback device. For instance, the first playback device may be playback device 116 in the bathroom of FIG. 1, and the control interface of playback device 116 may display text or icons indicating the second playback device 118 (e.g., "Device 2") or the Office zone (e.g., "Office"). Or, playback device 118 could be playing back media that includes Song A by Artist B and the indication displayed by the control interface of playback device 116 may include text or an icon that indicates the second playback device 118 is playing back Song A by Artist B. Alternatively or additionally, the control interface may display, as the indication, a visual sample of the media that is currently being played back by the second playback device 118. Other examples of visual indications are possible.

An audio or video indication of media being played back by the second playback device 118 may provide information to a user so that the user may decide whether to have the playback device 116 form a zone with the playback device 118 for synchronous playback of the media the playback device 118 is playing back. Audio and visual indications of media being played back may be provided simultaneously by the first playback device.

In some examples, the detected input is a second input preceded by a first input that is also received or detected at the control interface of the first playback device. According to such an example, the first input may be a touch-and-hold input to the control interface of the first playback device and the second input may include a release of the control interface. The first input may indicate a command for the first playback device to indicate a potential zone for the first playback device to join. In an example where the playback device 116 is only in communication with the playback device 118, the playback device 116 may determine that, in response to detecting a first input, the playback device 116 will indicate the zone "Office" or indicate the playback device 118. After making the determination, the playback device 116 may provide the indication of the determined zone as a potential zone for the first playback device to join.

In an example where the first playback device is included in a multi-zone environment (e.g., FIG. 1), the first playback device may determine multiple zones to indicate in response to detecting the first input. For instance, the first playback device may have stored in memory (e.g., memory 206 of FIG. 2) data representing signal strengths corresponding to respective zones or may detect or receive new signal strengths in response to detecting the first input. The first playback device could be playback device 122 in the master bedroom of FIG. 1 and may have stored in memory data representing signal strengths (possibly detected by playback device 122) of playback device 112 of the dining room zone, playback device 114 of the kitchen zone, and/or playback devices 128 and 120 of the bedroom zone. The first playback device 122 may determine the sequence of zones to indicate in order of increasing or decreasing signal strengths. As an illustration, the first playback device 122 may determine the sequence of zones to be indicated as (i) the bedroom zone represented by playback devices 128 and 120, (ii) the kitchen zone represented by playback device 114, and (iii) the dining room zone represented by playback device 112, corresponding to respective signal strengths detected by the first playback device 122. So, in response to detecting the touch-and-hold input at the control interface, the first playback device 122 may sequentially (and perhaps repetitively) indicate the respective playback zones according to the determined sequence until the second (e.g., release) input is detected. Then, in response to detecting the second input, the first playback device 122 may join the zone indicated by the control interface when the second input was detected.

In another instance, the first playback device 122, may determine the sequence of zones to indicate in order of most recent user interaction times of the respective zones. The first playback device may have stored in memory (e.g., memory 206 of FIG. 2) data representing most recent user interaction times corresponding to respective zones (e.g., timestamp data). As one example, a most recent interaction time could include a time when input was last provided to a playback device of the zone or when a playback device of the zone last provided playback of media. For instance, the first playback device could be playback device 122 of FIG. 1 and may have stored in memory data representing most recent interaction times of playback device 112 of the dining room zone, playback device 114 of the kitchen zone, and/or playback devices 128 and 120 of the bedroom zone. The first playback device 122 may determine the sequence of zones to indicate in chronological or reverse chronological order with respect to most recent interaction times of the zones. As an illustration, playback device 122 may determine the sequence of zones to be indicated as (i) the kitchen zone represented by playback device 114, (ii) the dining room zone represented by playback device 112, and iii) the bedroom zone represented by playback devices 128 and 120, corresponding to respective most recent user interaction times stored by the first playback device 122.

As discussed above, the first playback device may also determine the sequence of zones to indicate in an order in which the first playback device was last included in zones with other playback devices. The first playback device may have stored in memory (e.g., memory 206 of FIG. 2) data representing times when the first playback device was last included in zones with various playback devices (e.g., timestamp data). For instance, the first playback device could be playback device 122 of FIG. 1 and may have stored in memory data representing times (i) the first playback device 122 was last included in a zone with playback device 112, (ii) the first playback device 122 was last included in a zone with playback device 114, and/or (iii) the first playback device 122 was last included in a zone with the playback devices 120 and 128. The first playback device 122 may determine the sequence of zones to indicate in chronological or reverse chronological order with respect to the times corresponding to the zones. As an illustration, playback device 122 may determine the sequence of zones to be indicated as (i) the kitchen zone represented by playback device 114, (ii) the dining room zone represented by playback device 112, and (iii) the bedroom zone represented by playback devices 128 and 120.

In this instance the first playback device may, in response to detecting the touch-and-hold input at the control interface, sequentially (perhaps repetitively) indicate the respective playback zones according to the determined sequence until the second (e.g., release) input is detected. In response to detecting the second input, the first playback device may join the zone that was last indicated by the control interface when the second input was detected.

In another case, the first playback device may detect an input indicating a command for the first playback device to remain within the first zone and resume playback of media associated with the first zone. In this case, detecting the first input may cause playback devices of the first zone to pause media playback while potential zones for the first playback device to join are indicated by the control interface of the first playback device. Upon detecting the input indicating a command to remain within the first zone and resume playback of media associated with the first zone, the first playback device may resume media playback using a stored file offset or a track time corresponding to a point in the media where playback was paused.

At block 504, the method includes based on the detected input, causing (i) the first playback device and the second playback device to form the zone and (ii) the first playback device to playback the media in synchrony with the at least one second playback device. For example, causing the first playback device to playback media in synchrony with the at least one second playback device may include the first playback device receiving the media from the second playback device. The second playback device may send the media to the first playback device in response to the first playback device sending to the second playback device an indication of the command to form the zone and playback the media in synchrony. Row A of FIG. 6 illustrates one example of block 504 conceptually by showing, at time $t_1$ (shortly before the first playback device detects the input indicating a command to form the zone with at least the second playback device), a first playback device within a first zone and a second playback device within a second zone, and at time $t_2$ (shortly after the first playback device detects the input indicating the command to form the zone with at least the second playback device), the first and second playback devices being included in a single zone for synchronous playback of the media.

In some instances, before detecting the input, the first playback device may be included in a first zone that also includes a third playback device. In response to detecting the input, the first playback device may cause the third playback device to play back the media in synchrony with the first and second playback devices (i.e., the third playback device joins the zone with the first playback device). Row B of FIG. 6 depicts this example conceptually by depicting, at time $t_1$, a first playback device and a third playback device within a first zone and a second playback device within a second zone, and at time $t_2$, the first, second, and third playback devices being included in a single zone for synchronous playback of the media.

In the example shown with respect to Row B, the first playback device may be a zone coordinator of the first zone prior to forming the zone with the second playback device. As the zone coordinator, the first playback device may control or communicate with other playback devices of the first zone in various ways. For instance, the zone coordinator may provide media and/or timing information to other playback devices of the zone. Alternatively the third playback device may be the zone coordinator of the first zone. Either the first playback device or the third playback device can determine the zone that the first and third playback devices may join. Alternatively, either playback device can communicate with the second playback device (or a zone coordinator of the second zone) to facilitate the first and third playback devices joining the second zone.

Figure 6:
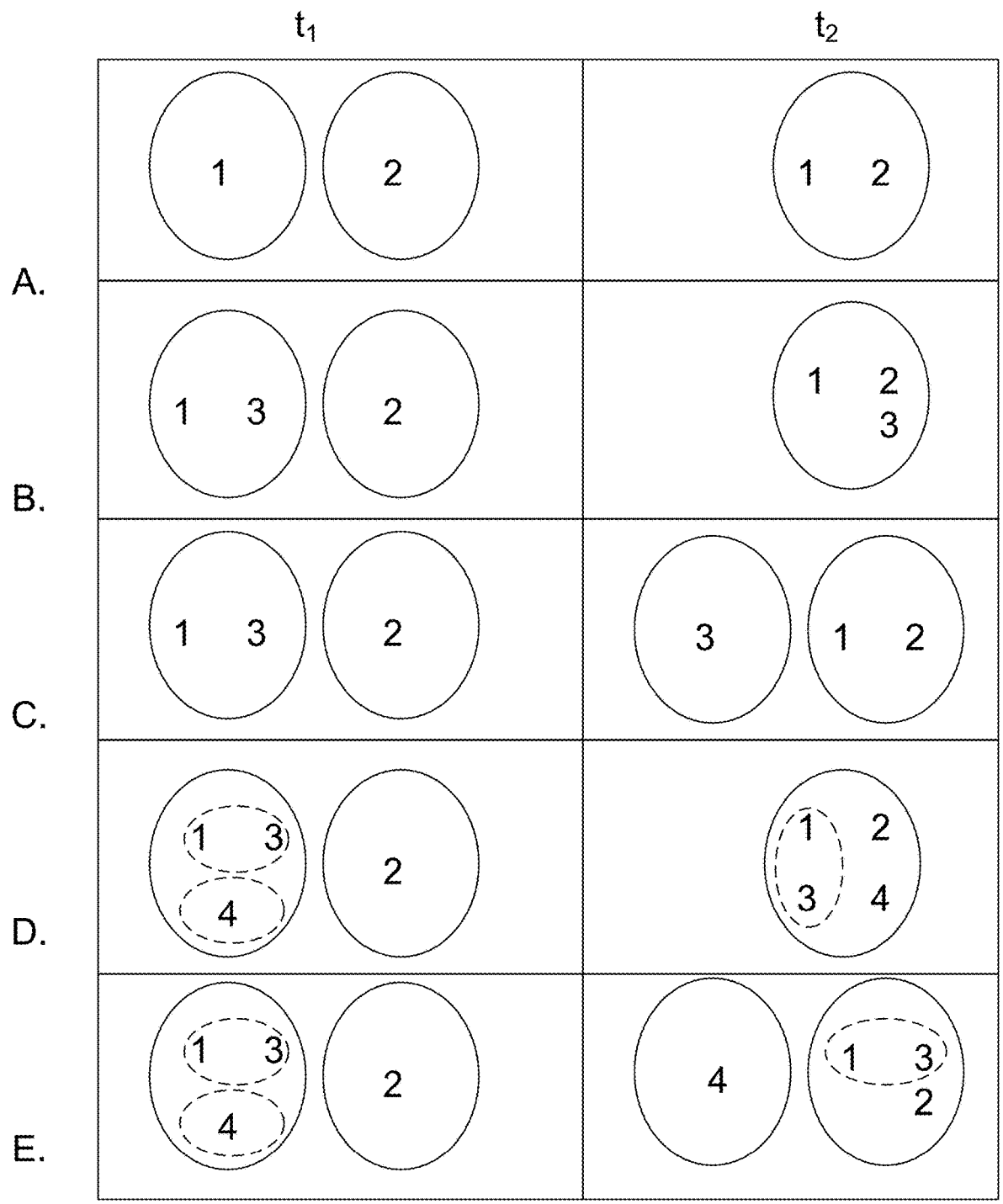
FIG. 6 shows example events and example devices.

In a situation depicted in Row C of FIG. 6, prior to detecting the input at the control interface (e.g., at time $t_1$), the first playback device may be included in a first zone with a third playback device and the second playback device may be within a second zone. In response to the detected input, the first and second playback devices may form a zone and playback the (first) media in synchrony, but the first playback device may cause the third playback device to playback a second media while the first and second playback devices playback the first media in synchrony (e.g., at time $t_2$). That is, the input indicates a command for the first playback device to leave the first zone to join the second zone and consequently the third playback device remains in the first zone.

Prior to the first playback device leaving the first zone that includes the third playback device to form a zone with the second playback device, the first playback device may act a zone coordinator of the first zone. But when the first playback device leaves the first zone, the first playback device may cause the third playback device to become a (new) zone coordinator of the first zone. The first playback device may determine the third playback device to become the zone coordinator of the first zone based on respective signal strengths of playback devices of the first zone detected by the third playback device. That is, the third playback device may detect the signal strengths of various playback devices of the first zone and send signal strength data to the first playback device so that the first playback device can determine the new zone coordinator. In another example, the first playback device may determine which of various playback devices of the first zone has a strongest communication link to playback devices of the second zone (e.g., average signal strengths of playback devices of the second zone detected by playback devices of the first zone), and cause the playback device of the first zone with the strongest communication link to the second zone to become a (new) zone coordinator of the second playback zone. By way of example, the third playback device, of any remaining playback device of the first zone, may be most centrally located within the first zone and best suited to control the playback devices of the first zone. In this way, the new zone coordinator of the first zone may be determined based on the new zone coordinator's capability to effectively communicate with other playback devices of the first zone.

So that the first playback device may determine the third playback device to be a new zone coordinator, data representing various states of playback devices may be stored in a table within a memory (e.g., memory 206 of FIG. 2) of the first playback device, or another playback device that is in communication with the first playback device. The playback device storing the data may share the data with other playback devices via UPnP (Universal Plug and Play) protocols and may update the stored data in response to state changes of the media playback devices (e.g., a playback device leaving or joining a zone, starting or stopping playback of media, or becoming or ceasing to be a zone coordinator). For example, such a table could be a data array with rows representing various playback devices and columns representing data such as (i) a zone identifier indicating the zone of a corresponding playback device, (ii) a bit indicating whether or not the corresponding playback device is a zone coordinator of the indicated zone (an ungrouped playback device may be a zone coordinator by default), and (iii) whether the corresponding playback device (i.e., a corresponding playback zone) is currently playing back media, among other possibilities. In other examples, a playback device may query another playback device (e.g., a zone coordinator) for such information as needed.

In another example, the first and third playback devices may be a bonded pair (or bonded zone) that functions, for example, as a left stereo playback device that plays a left channel of media and a right stereo playback device that plays a right channel of media. Another example of a bonded pair may include any two playback devices that are permanently grouped or paired to act in unison as a single playback device. After forming the zone with the second playback device, the first playback device may play back a first stereo portion of the media and the third playback device may play back a second stereo portion of the media being played back by the second playback device. Also, as depicted in Row D of FIG. 6, prior to detecting the input (e.g., time $t_1$) the bonded pair that includes the first and third playback devices could be included in a first zone that further includes a fourth playback device. In response to the detected input (as shown at time $t_2$), the first, second, third, and fourth playback devices may playback the media in synchrony as a zone. However, as shown in Row E of FIG. 6, it is also possible that the fourth playback device remains in the first zone to play a second media as the first and third playback devices form the zone with the second playback device.

In another example, when the input is received at the control interface of the first playback device, there may be no other playback devices or zones engaging in playback of media. Here, it is possible the input either has no effect on the first playback device, or the input may cause the first playback device to form a zone with the second playback device such that when playback of media is initiated in the second zone, the first playback device will then join the second playback device in synchronous playback of the media.

In yet another example, the input received by the control interface of the first playback device may cause the first playback device to form a zone with all other playback devices that are in communication with or associated with the first playback device for playback of a given media. For example, the received input could cause playback device 102 to join with all other playback devices depicted in FIG. 1 for synchronous playback of a common media.

Figure 7:
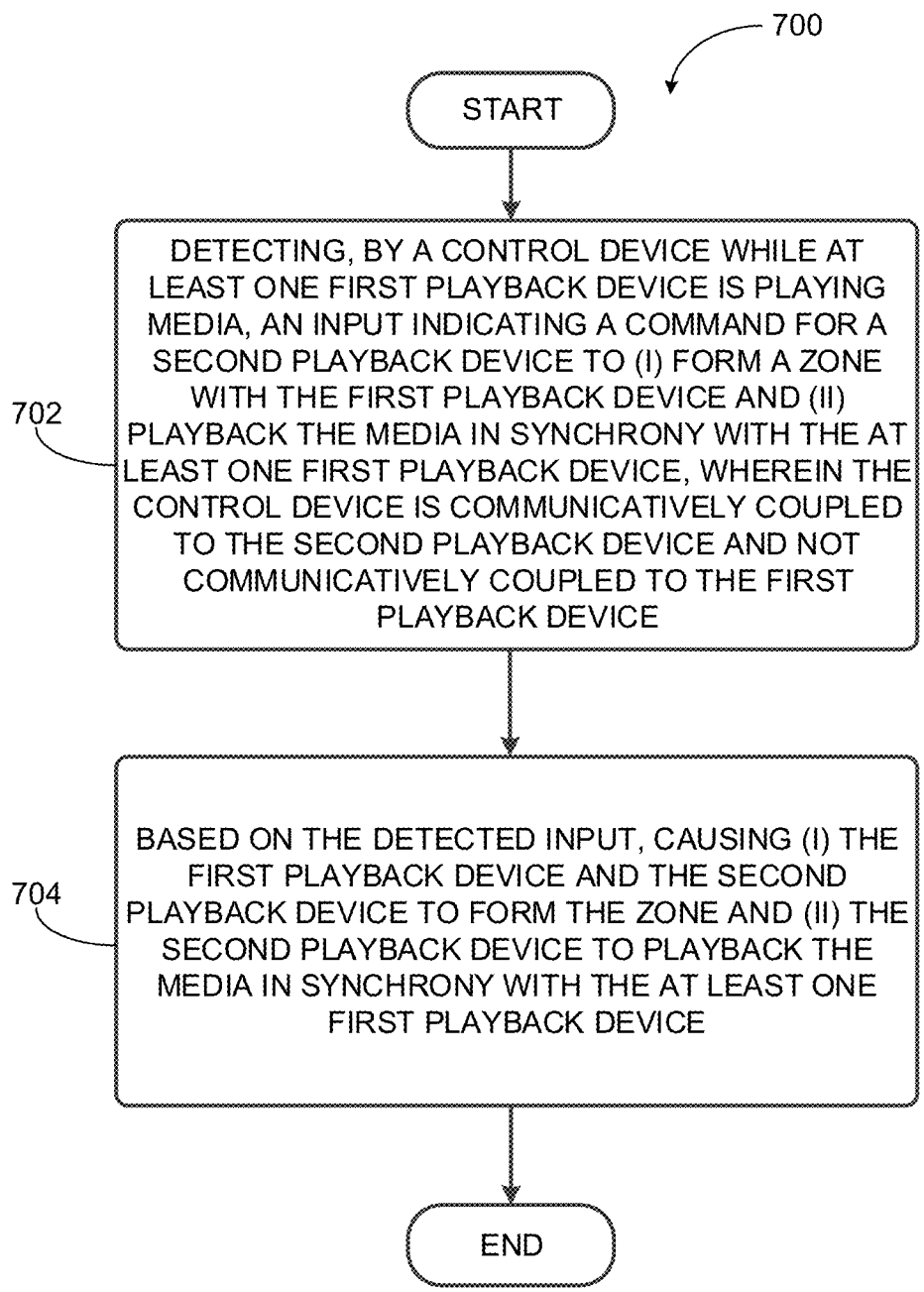
FIG. 7 shows an example flow diagram for another example method.

Method 700 shown in FIG. 7 presents an example method that can be implemented within an operating environment involving, for example, the media playback system 100 of FIG. 1 and one or more of the playback device 200 of FIG. 2. Method 700 may include one or more operations, functions, or actions as illustrated by one or more of blocks 702 and 704. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 700 and other processes and methods disclosed herein, each block in FIG. 7 may represent circuitry that is wired to perform the specific logical functions in the process.

At block 702, the method includes detecting, by a control device while at least one first playback device is playing media, an input indicating a command for a second playback device to (i) form a zone with the first playback device and (ii) playback the media in synchrony with the at least one first playback device. The control device is communicatively coupled to the second playback device but not necessarily communicatively coupled to the first playback device. That is, the control device may be a bonded controller. Detecting the input may involve receiving the input at the control device.

In some examples, the bonded controller is a portable device that includes a control interface, a processor, data storage, and/or a communication interface. The bonded controller may be configured to communicate, via the communication interface, with a single playback device (or a bonded zone of playback devices) via infrared, Bluetooth, WIFI, or other commonly known wireless communication protocols. The control interface may include any mechanism for input such as a key, a knob, a dial, a push-button, a soft key, a combination of different keys, and so on. By way of illustration, the bonded controller can be placed in a room associated with a playback device or bonded zone with which the bonded controller is bonded.

Figure 8:
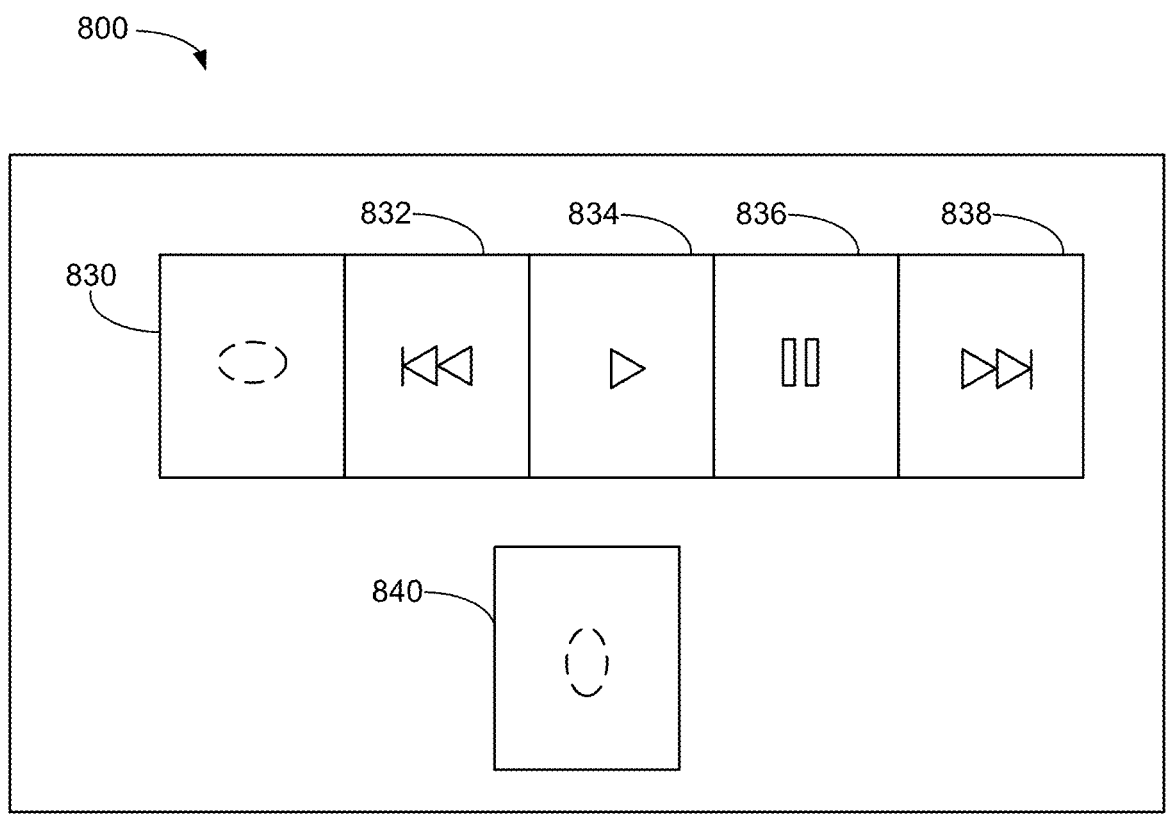
FIG. 8 shows an example bonded controller.

FIG. 8 depicts an example bonded controller 800. The bonded controller 800 may be bonded to a first playback device (or a bonded zone including the first playback device)

and include several push-buttons. For example, receiving input at push-button 830 may cause the first playback device (and/or other playback devices in the first zone) to form the zone with at least the second playback device. Receiving input at push-button 832 may cause the first playback device (and/or other playback devices in the first zone) to advance through a playback queue in a first direction, receiving input at push-button 834 may cause the first playback device (and/or other playback devices in the first zone) to begin playback of media, receiving input at push-button 836 may cause the first playback device (and/or other playback devices in the first zone) to pause playback of media, and receiving input at push-button 838 may cause the first playback device (and/or other playback devices in the first zone) to advance through a playback queue in a second direction, Receiving input at push-button 840 may initiate a process for causing the bonded controller to become bonded to another playback device or another bonded zone. In some examples, the bonded controller 800 may also have any control interface features depicted in FIGS. 5B-5D.

Referring back to FIG. 7, at block 704 the method includes, based on the detected input, causing (i) the first playback device and the second playback device to form the zone and (ii) the second playback device to playback the media in synchrony with the at least one first playback device.

One of ordinary skill in the art will appreciate that all functionality described above in relation to method 600 may be similarly applied to method 700. While method 600 describes functions being performed in response to receiving or detecting one or more inputs at a control interface of a first playback device, method 700 may differ only in that the one or more inputs may be received or detected at a control device (e.g., a bonded controller) that is communicatively coupled to only one playback device.

One of skill in the art will also appreciate that while this disclosure provides examples of media playback devices that interact with each other in response to provided inputs, similar interactions could take place in other areas of home or office automation. For example, an input could be detected at a dishwasher, causing the dishwasher to assume a common operation schedule (i.e., form a zone) with a washer and a dryer. This could cause the dishwasher to turn on or turn off in synchrony with the washer and/or dryer, to consume electricity at off-peak hours, for example. Or as another example, an input could be detected at a control interface of a lighting module in a living room, causing the lighting module to form a zone with a lighting module in a kitchen, thereby causing the lighting module in the living room to assume an operation schedule of the lighting module in the kitchen. This may cause the lighting modules to turn on/off and/or dim according to a common schedule. Other examples are possible.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Examples described herein involve, among other things, detecting an input at a control interface or a bonded controller of a first playback device so that the first playback device (i) forms a zone with a second playback device that is already playing back media and (ii) plays back the media in synchrony with the at least one second playback device. Other aspects of the examples will be made apparent in the remainder of the description herein.

In one aspect, a method is provided. The method involves detecting, via a control interface of a first playback device while at least one second playback device is playing media, an input indicating a command for the first playback device to (i) form a zone with the second playback device and (ii) play back the media in synchrony with the at least one second playback device and based on the detected input, causing (i) the first playback device and the second playback device to form the zone and (ii) the first playback device to play back the media in synchrony with the at least one second playback device.

In another aspect, a first playback device is provided. The first playback device includes a processor and memory storing instructions that when executed by the first playback device, cause the first playback device to perform functions. The functions include detecting, via a control interface of the first playback device while at least one second playback device is playing media, an input indicating a command for the first playback device to (i) form a zone with the second playback device and (ii) play back the media in synchrony with the at least one second playback device; and based on the detected input, causing (i) the first playback device and the second playback device to form the zone and (ii) the first playback device to play back the media in synchrony with the at least one second playback device.

In yet another aspect, a non-transitory computer readable memory is provided. The non-transitory computer readable memory has stored thereon instructions executable by a first playback device to cause the first playback device to perform functions. The functions include detecting, via a control interface of the first playback device while at least one second playback device is playing media, an input indicating a command for the first playback device to (i) form a zone with the second playback device and (ii) play back the media in synchrony with the at least one second playback device; and based on the detected input, causing (i) the first playback device and the second playback device to form the zone and (ii) the first playback device to play back the media in synchrony with the at least one second playback device.

In another aspect, a method is provided. The method involves detecting, by a control device while at least one first playback device is playing media, an input indicating a command for a second playback device to (i) form a zone with the first playback device and (ii) play back the media in synchrony with the at least one first playback device, wherein the control device is communicatively coupled to the second playback device and not communicatively coupled to the first playback device; and based on the detected input, causing (i) the first playback device and the second playback device to form the zone and (ii) the second playback device to play back the media in synchrony with the at least one first playback device.

In another aspect, a control device is provided. The control device includes a processor and memory storing instructions that when executed by the control device, cause the control device to perform functions. The functions include detecting, by the control device while at least one first playback device is playing media, an input indicating a command for a second playback device to (i) form a zone with the first playback device and (ii) play back the media in synchrony with the at least one first playback device, wherein the control device is communicatively coupled to the second playback device and not communicatively coupled to the first playback device; and based on the detected input, causing (i) the first playback device and the second playback device to form the zone and (ii) the second playback device to play back the media in synchrony with the at least one first playback device.

In yet another aspect, a non-transitory computer readable memory is provided. The non-transitory computer readable memory has stored thereon instructions executable by a control device to perform functions. The functions include detecting, by the control device while at least one first playback device is playing media, an input indicating a command for a second playback device to (i) form a zone with the first playback device and (ii) play back the media in synchrony with the at least one first playback device, wherein the control device is communicatively coupled to the second playback device and not communicatively coupled to the first playback device; and based on the detected input, causing (i) the first playback device and the second playback device to form the zone and (ii) the second playback device to play back the media in synchrony with the at least one first playback device.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A first playback device, comprising:
an output interface configured to output audio;
an input interface configured to receive user input;
at least one processor;
at least one non-transitory computer-readable medium; and
program instructions stored on the at least one non-transitory computer-readable medium that are executable by the at least one processor such that the first playback device is configured to:
receive, via the input interface, a first user input, wherein the first user input comprises a command to control media playback of the first playback device;
based on receiving the first user input, control media playback of the first playback device;
receive, via the input interface, a second user input, wherein the second user input (i) comprises a command to identify a second playback device from among a plurality of playback devices to engage in synchronous playback of media content with and (ii) does not identify the second playback device; and
based on receiving the second user input:
determine that a given playback device of the plurality of playback devices is currently playing back given media content;
based on the determination, identify the second playback device, wherein the second playback device is the given playback device; and
begin to engage in synchronous playback of the given media content with the second playback device.

2. The first playback device of claim 1, wherein the input interface comprises a push-button, and wherein one or both of the first input and the second input comprise an input received via the push-button.

3. The first playback device of claim 2, wherein the first input comprises a push and release input to the push-button, and wherein the second input comprises a push and hold input to the push-button.

4. The first playback device of claim 1, further comprising program instructions stored on the at least one non-transitory computer-readable medium that are executable by the at least one processor such that the first playback device is configured to:
based on determining that the second playback device is currently playing back the given media content, output, via the output interface, audio that provides information about the second playback device.

5. The first playback device of claim 4, wherein the program instructions that are executable by the at least one processor such that the first playback device is configured to begin to engage in synchronous playback of the given media content with the second playback device comprise program instructions that are executable by the at least one processor such that the first playback device is configured to:
begin to engage in synchronous playback of the given media content with the second playback device based on receiving the second user input after the first playback device has finished outputting the audio that provides information about the second playback device.

6. The first playback device of claim 4, wherein the audio that provides information about the second playback device comprises at least one of (i) audio that provides an identification of the second playback device or (ii) audio that provides information about the given media content.

7. The first playback device of claim 1, further comprising program instructions stored on the at least one non-transitory computer-readable medium that are executable by the at least one processor such that the first playback device is configured to:

after beginning to engage in synchronous playback of the given media content with the second playback device, receive, via the input interface, a third user input; and based on receiving the third user input, cause the synchronous playback of the given media content by the first playback device and the second playback device to pause.

8. The first playback device of claim 1, wherein the program instructions that are executable by the at least one processor such that the first playback device is configured to begin to engage in synchronous playback of the given media content with the second playback device comprise program instructions that are executable by the at least one processor such that the first playback device is configured to:

receive the given media content from the second playback device via a data network.

9. The first playback device of claim 1, wherein the program instructions that are executable by the at least one processor such that the first playback device is configured to begin to engage in synchronous playback of the given media content with the second playback device comprise program instructions that are executable by the at least one processor such that the first playback device is configured to:

transmit the given media content to the second playback device via a data network.

10. The first playback device of claim 1, wherein the output interface is configured to output audio via a speaker.

11. A non-transitory computer-readable medium, wherein the non-transitory computer-readable medium is provisioned with program instructions that, when executed by at least one processor, cause a first playback device to:

receive, via an input interface of the first playback device, a first user input, wherein the first user input comprises a command to control media playback of the first playback device;

based on receiving the first user input, control media playback of the first playback device;

receive, via the input interface, a second user input, wherein the second user input (i) comprises a command to identify a second playback device from among a plurality of playback devices to engage in synchronous playback of media content with and (ii) does not identify the second playback device; and based on receiving the second user input:
determine that a given playback device of the plurality of playback devices is currently playing back given media content;
based on the determination, identify the second playback device, wherein the second playback device is the given playback device; and
given media content, begin to engage in synchronous playback of the given media content with the second playback device.

12. The non-transitory computer-readable medium of claim 11, wherein the input interface comprises a push-button, and wherein one or both of the first input and the second input comprise an input received via the push-button.

13. The non-transitory computer-readable medium of claim 12, wherein the first input comprises a push and release input to the push-button, and wherein the second input comprises a push and hold input to the push-button.

14. The non-transitory computer-readable medium of claim 11, wherein the non-transitory computer-readable medium is also provisioned with program instructions that, when executed by at least one processor, cause the first playback device to:

based on determining that the second playback device is currently playing back the given media content, output, via an output interface of the first playback device, audio that provides information about the second playback device.

15. The non-transitory computer-readable medium of claim 14, wherein the program instructions that, when executed by at least one processor, cause the first playback device to begin to engage in synchronous playback of the given media content with the second playback device comprise program instructions that, when executed by at least one processor, cause the first playback device to:

begin to engage in synchronous playback of the given media content with the second playback device based on receiving the second user input after the first playback device has finished outputting the audio that provides information about the second playback device.

16. The non-transitory computer-readable medium of claim 14, wherein the audio that provides information about the second playback device comprises at least one of (i) audio that provides an identification of the second playback device or (ii) audio that provides information about the given media content.

17. The non-transitory computer-readable medium of claim 11, wherein the non-transitory computer-readable medium is also provisioned with program instructions that, when executed by at least one processor, cause the first playback device to:

after beginning to engage in synchronous playback of the given media content with the second playback device, receive, via the input interface, a third user input; and based on receiving the third user input, cause the synchronous playback of the given media content by the first playback device and the second playback device to pause.

18. The non-transitory computer-readable medium of claim 11, wherein the program instructions that, when executed by at least one processor, cause the first playback device to begin to engage in synchronous playback of the given media content with the second playback device comprise program instructions that, when executed by at least one processor, cause the first playback device to:

receive the given media content from the second playback device via a data network.

19. The non-transitory computer-readable medium of claim 11, wherein the program instructions that, when executed by at least one processor, cause the first playback device to begin to engage in synchronous playback of the given media content with the second playback device comprise program instructions that, when executed by at least one processor, cause the first playback device to:

transmit the given media content to the second playback device via a data network.

20. A method implemented by a first playback device, the method comprising:

receiving, via an input interface of the first playback device, a first user input, wherein the first user input comprises a command to control media playback of the first playback device;

based on receiving the first user input, controlling media playback of the first playback device;

receiving, via the input interface, a second user input, wherein the second user input (i) comprises a command to identify a second playback device from among a plurality of playback devices to engage in synchronous playback of media content with and (ii) does not identify the second playback device; and based on receiving the second user input:
- determining that a given playback device of the plurality of playback devices is currently playing back given media content;
- based on the determining, identifying the second playback device, wherein the second playback device is the given playback device; and
- based on determining that the second playback device is currently playing back the given media content, beginning to engage in synchronous playback of the given media content with the second playback device.

* * * * *